United States Patent
Peterson (10) Patent No.: US 10,359,962 B1
(45) Date of Patent: Jul. 23, 2019

(54) SYSTEM AND METHOD FOR STORING A DATABASE ON FLASH MEMORY OR OTHER DEGRADABLE STORAGE

(71) Applicant: Yellowbrick Data, Palo Alto, CA (US)

(72) Inventor: Jim Peterson, San Jose, CA (US)

(73) Assignee: Yellowbrick Data, Inc., Palo Alto, CA (US)

( * ) Notice: Subject to any disclaimer, the term of this patent is extended or adjusted under 35 U.S.C. 154(b) by 284 days.

(21) Appl. No.: 15/272,259

(22) Filed: Sep. 21, 2016

Related U.S. Application Data (60) Provisional application No. 62/221,551, filed on Sep. 21, 2015, provisional application No. 62/333,597, filed on May 9, 2016.

(51) Int. Cl.
G06F 16/00 (2019.01)
G06F 3/06 (2006.01)
G06F 16/23 (2019.01)

(52) U.S. Cl.
CPC .......... *G06F 3/0638* (2013.01); *G06F 3/0604* (2013.01); *G06F 3/0656* (2013.01); *G06F 3/0679* (2013.01); *G06F 16/2365* (2019.01)

(58) Field of Classification Search
CPC combination set(s) only.
See application file for complete search history.

(56) References Cited

U.S. PATENT DOCUMENTS

| | | | |
|---|---|---|---|
| 5,999,936 A * | 12/1999 | Pattison | G06F 16/24561 |
| 7,548,928 B1 * | 6/2009 | Dean | G06F 17/30985 |
| 8,996,790 B1 * | 3/2015 | Segal | G06F 12/0246 711/103 |
| 9,432,298 B1 * | 8/2016 | Smith | H04L 49/9057 |
| 9,817,563 B1 * | 11/2017 | Stokes | G06T 11/206 |
| 9,922,090 B1 * | 3/2018 | Zukowski | G06F 16/24561 |
| 10,218,976 B2 * | 2/2019 | Thiagarajan | H04N 19/124 |
| 2008/0260002 A1 * | 10/2008 | Zhang | H04B 7/0417 375/144 |
| 2010/0023682 A1 * | 1/2010 | Lee | G06F 12/0246 711/103 |
| 2012/0293370 A1 * | 11/2012 | Su | H04B 7/043 342/373 |
| 2013/0086006 A1 * | 4/2013 | Colgrove | G06F 3/0608 707/692 |
| 2013/0129246 A1 * | 5/2013 | Frederiksen | H04N 9/67 382/248 |
| 2014/0037268 A1 * | 2/2014 | Shoji | H04N 5/85 386/248 |
| 2014/0059311 A1 * | 2/2014 | Oberhofer | G06F 3/061 711/162 |
| 2014/0321764 A1 * | 10/2014 | Zarom | H04N 19/593 382/243 |
| 2016/0092497 A1 * | 3/2016 | Oberhofer | G06F 17/30371 707/693 |
| 2016/0321323 A1 * | 11/2016 | Gaumnitz | G06F 17/30336 |
| 2017/0075937 A1 * | 3/2017 | Moehler | G06F 17/30318 |
| 2017/0286507 A1 * | 10/2017 | Hosogi | G06F 16/245 |

* cited by examiner

*Primary Examiner* — Noosha Arjomandi
(74) *Attorney, Agent, or Firm* — Innovation Partners; Charles E. Gotlieb (57) ABSTRACT

A system and method stores a database file into Flash memory or other write-constrained storage.

5 Claims, 6 Drawing Sheets

SYSTEM AND METHOD FOR STORING A DATABASE ON FLASH MEMORY OR OTHER DEGRADABLE STORAGE

RELATED APPLICATIONS

This application claims the benefit of U.S. Provisional Patent Application Ser. No. 62/221,551 entitled, "Method and Apparatus for Storing a Database on Flash Memory or Other Degradable Storage" filed by Jim Peterson on Sep. 21, 2015 and U.S. Provisional Patent Application Ser. No. 62/333,597 entitled, "Method and Apparatus for Storing and Reading a Database on Flash memory or Other Degradable Storage" filed by Jim Peterson on May 9, 2016 and each is hereby incorporated by reference in its entirety.

FIELD OF THE INVENTION

The present invention is related to computer software and more specifically to computer software and hardware for storing a database on flash memory.

BACKGROUND OF THE INVENTION

Flash memory is a type of memory that can only be written or erased a limited number of times before it cannot be rewritten or erased. This can make flash memory suboptimal for storing a database. What is needed is a system and method for storing a database in flash or other type of storage in which writing and rewriting is less desirable.

SUMMARY OF INVENTION

A system and method stores a database in a data file into flash or other similar memory or storage that is degraded each time it is written, thereby limiting the number of times it may be written. The data file is logically divided into portions, and then each portion is processed as described herein, though in one embodiment, there is only one "portion" consisting of the entire file.

The columns in each portion are sampled to identify a compression strategy for the column within that portion, for example by indicating a number of sequential values that are the same value, such as null, for multiple rows of the column. The compression strategy may optionally include a dictionary mapping a limited range of values to a more compact representation of each value. If a dictionary is used for the compression strategy for a column, the dictionary is written to a 32 kilobyte dictionary buffer.

The compression strategy for a column can be identified as applying to the entire column of the portion without exception, the entire column of the portion with exceptions, or may not be identified for the column, based on how varied the data is in the column. Additional sampling may be performed if the initial sampling indicates the data may be sufficiently simple so that a single compression strategy for the entire column is warranted, or whether no compression strategy for the column can be or should be identified.

Each column in the selected portion is processed by selecting a certain number of rows in the column, not past the end of the file or portion, referred to as a compression unit, identifying the range of values in the compression unit, and other metadata, such as the minimum and maximum value of the values in the rows in the compression unit. The values in the compression unit are compressed using the compression strategy, and optionally the minimum and maximum values. If a column compression strategy does not exist or does not apply to the entire column, a compression strategy is identified for the compression unit.

The compressed data and metadata for the compression unit are stored in a buffer of a fixed size, such as 32 kilobytes, in the flash or similar memory, with a new buffer in flash memory started following the prior buffer if there is insufficient capacity to store the compressed data and metadata for the column. Buffers may be written to flash one compression unit at a time, or they may be assembled in RAM and written to flash when convenient. Pointers to each buffer in flash memory are stored in RAM as the buffers are created, and the pointer is marked in RAM with the column identifier to which it corresponds if it points to the first compression unit of a column within the portion. This is repeated as many times as needed to process the entire column in the portion. As the column is processed, column metadata is updated if a higher maximum or lower minimum is located in the compression unit for that column so that the column metadata for any portion of the file includes the minimum and maximum for the column within the portion.

As each column is processed or thereafter, metadata for the entire column within the selected portion is identified, such as by generating bitmaps or bloom filters, and counts or fractions of null values in the column within the portion. Similar data may be identified for each buffer, and for each compression unit. This additional compression unit metadata is written to the buffer.

A series of 32 kilobyte pointer buffers are written to flash memory containing pointers to each buffer stored in flash memory containing the compression units and compression unit metadata. A header follows the series of pointer buffers, the header containing pointers to each of the pointer buffers. Following these pointers in flash memory are a series of column pointers, one for each column in the file, each containing the column name, and a pointer to the column metadata. The column metadata follows the column pointers, and stored with the column metadata in flash memory is a pointer to the pointer in the pointer buffer pointing to the first compression unit for the column within the portion of the file and, optionally, a pointer to the pointer in the pointer buffer that points to the first part of a dictionary for part or all of the column if one was identified for the column. A pointer to the header is provided or stored in flash memory, and the process is repeated for each portion of the file. The header, column pointers and column metadata may be used to access the compression units stored in the file containing all of the information written to flash memory as described herein.

BRIEF DESCRIPTION OF THE DRAWINGS

FIG. 2, consisting of FIG. 2A, FIG. 2B.

DETAILED DESCRIPTION OF A PREFERRED EMBODIMENT

Figure 1:
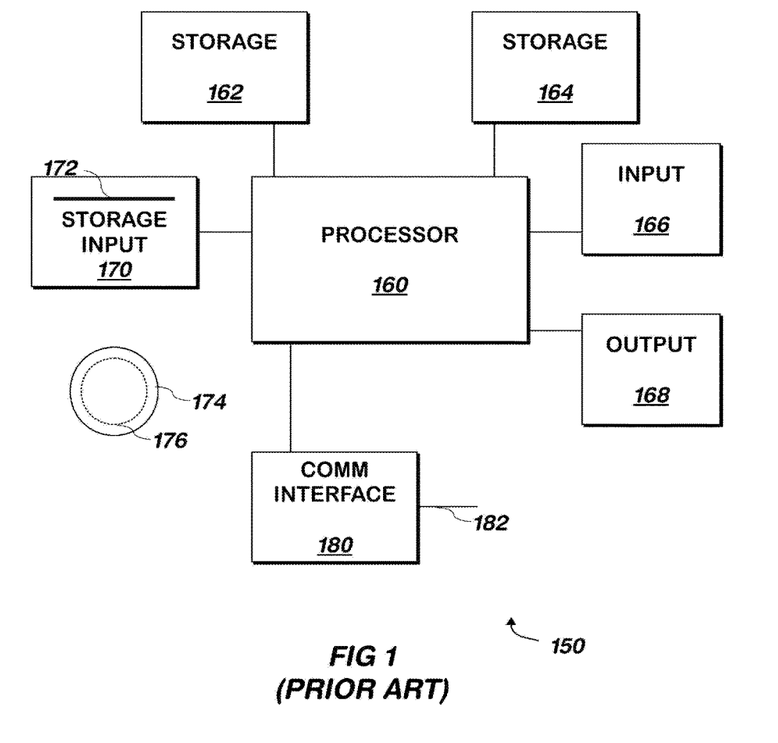
FIG. 1 is a block schematic diagram of a conventional computer system.

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile and non-transitory storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below. Communications interface 180 is a conventional TCP/IP-compatible communication interface running TCP/IP, Ethernet, or other communication protocols and coupled via input/output 182 to an Ethernet network, the networks of the Internet, or both. A processor system is a system that performs processing functions and contains at least one processor. A memory system is a system that stores data or instructions and contains at least one type of computer storage.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7, 8 or 10) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
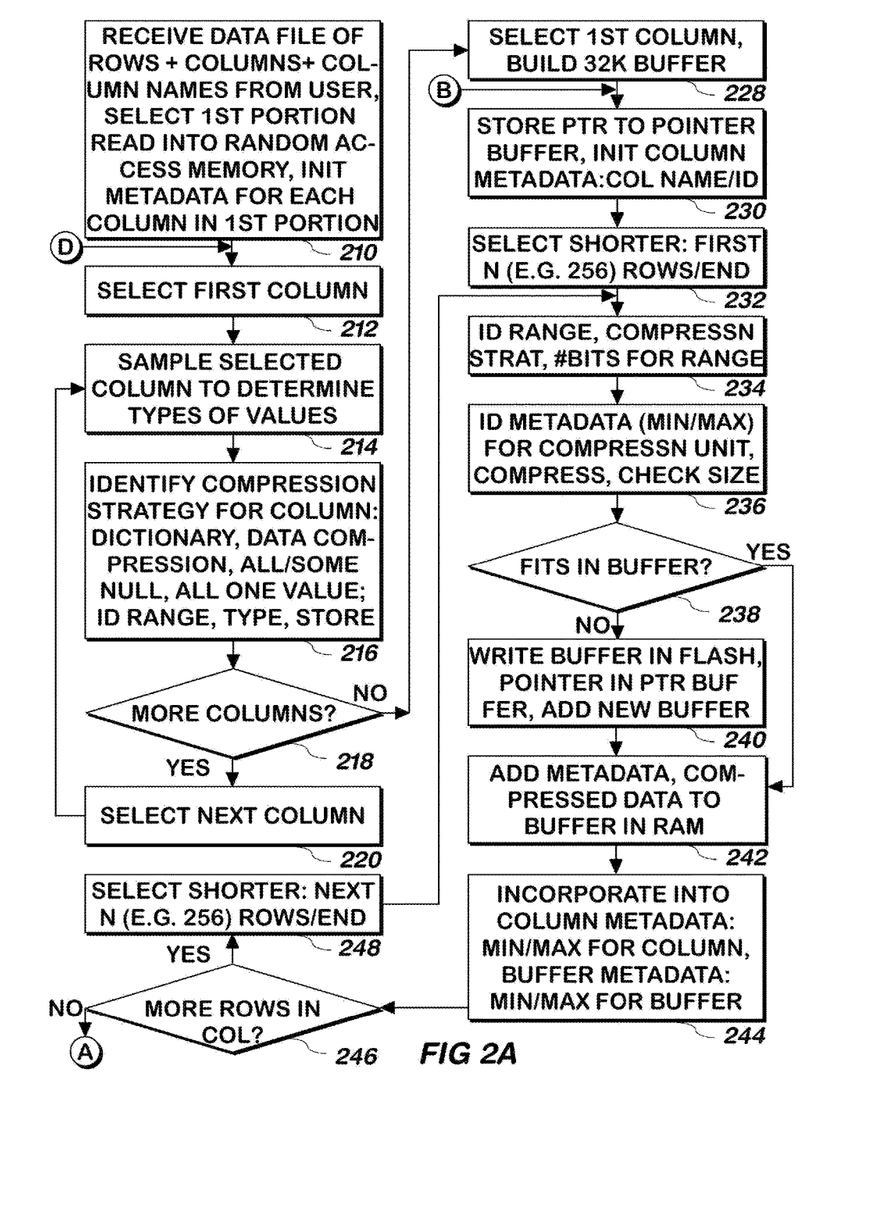
Figure 2B:
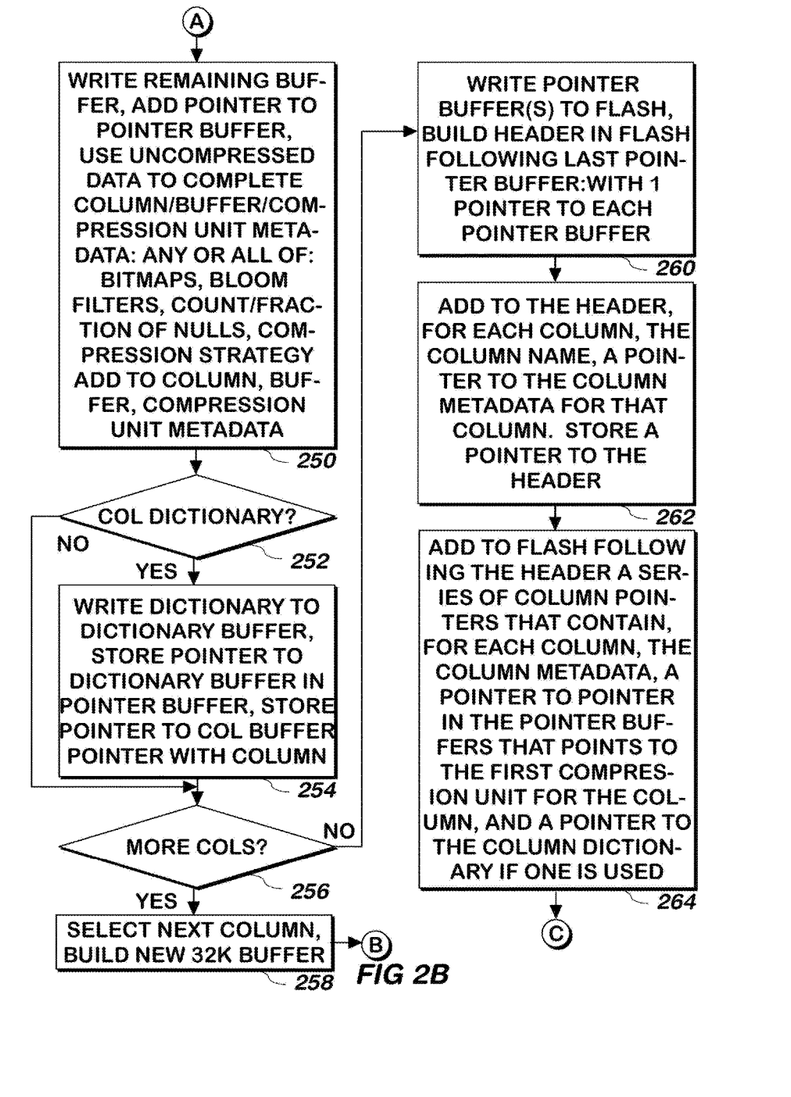
Figure 2C:
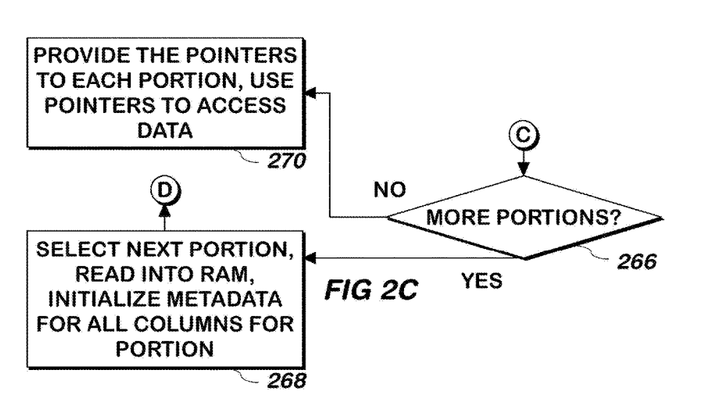
FIG. 2C is a flowchart illustrating a method of storing a database on flash memory or other similarly write-constrained storage according to one embodiment of the present invention.

Referring now to FIG. 2, consisting of FIG. 2A, FIG. 2B, and FIG. 2C, a method of storing database data on flash memory or other memory that can be worn out from repeated writing and/or erasing, is shown according to one embodiment of the present invention. Although flash memory is described herein, the present invention applies to other types of memory that have a limited number of writes or erases possible before they cannot perform one or both functions or nonvolatile storage that is substantially slower to write than the fastest nonvolatile storage, and such memory is referred to herein as "flash memory". Conventional random access memory or disk storage is not considered flash memory, although it may not operate forever. A database file consisting of multiple rows of multiple columns is received 210 from a user and read into conventional random access memory, which does not have the wear-out problem of flash memory, or other types of memory into which the data file will ultimately be written, as described herein. In one embodiment, the data file includes column names, but if the column names are not received, other column identifiers, such as the number of the column, starting at zero from the left-hand side, may be used in place of the column name, as described herein.

In one embodiment, the file may be logically split into portions, and the portions processed one at a time, as described herein. A portion may be a number of rows, percentage of rows in the file, or an amount of data read in whole rows up to the amount, unless the end of the file is reached before the number of rows is encountered, in which case the portion is the rows following the end of any prior portion to the end of the file. The rows may be allocated to different portions on the basis of a number or percentage of rows of the file, a maximum amount of data, or they may be allocated to improve the compression to enable a smaller resulting file in flash memory. For example, if a block of the first set of the rows in the file have mostly whole numbers in the values of each column, and then a block of rows have mostly nulls in the columns, followed by another block of rows with mostly whole numbers in the columns, the partition boundaries may be made at the boundaries of these blocks, to allow different compression strategies to be used for the different characteristics of the blocks, as described in more detail below.

In the embodiment in which multiple portions of the file are used, the first portion is selected, and certain metadata for each column in the selected portion is initialized, for example, by identifying the portion (0, 1, 2, etc.) as part of step 210.

The first column, such as column zero, is selected 212. Some of the rows in the selected column are sampled 214 in order to determine the types and range of values stored in the column. The types of values may be conventional data types, in which no, all, or some of the values are null, the range of non-null values may be limited in number (e.g. days of the week, or month of the year) or not so limited (e.g. real numbers), and the values may have a small range of values or a much larger range of values. Sampling may occur only within the selected portion, or throughout all portions of the file in which case steps 212 through 220 need only be performed once.

A compression strategy is identified 216 using the type and range of the data in the selected column, optionally within the selected portion of the file, using conventional compression identification techniques. For example, if all of the sampled values were null, the compression strategy may be to indicate that all of the values of the selected column are null, and therefore the values of the rows of that column need not be stored and are not stored. If the non-null values were limited in number of different values, the compression strategy may be to map the limited number of values to a small numeric value using a dictionary, such as mapping the months of the year to the values zero through 11. If some of the values are null, the compression strategy may include reserving a special value that indicates one or more consecutive values of the rows of the column are null, along with the number of such consecutive rows. The compression strategy and the range of values (or an indicator that the range is essentially unlimited) and any dictionary or a dictionary type indicator from commonly seen types of data that can be compressed using a dictionary (e.g. months of the year, days of the week, etc.) are stored as column metadata along with the column name or identifier for the selected column as part of step 216. A dictionary indicates for each value in the compressed file, the corresponding value of the data from the file as received, such as 0=January, 1=February, etc. If a dictionary for the column is identified, the dictionary is written to an available dictionary buffer in flash memory: in one embodiment, each dictionary buffer is 32 kilobytes, and as many buffers as needed may be added. A dictionary buffer may hold no more than one dictionary in one embodiment, or in another embodiment, a single dictionary buffer may hold multiple dictionaries for multiple columns.

In one embodiment, the compression strategy for the column has a type, which is one of the following: 0) the compression strategy that applies to the entire column for the current portion of the file, 1) there is no compression strategy for the column for the selected portion of the file, as the compression strategy should be calculated for each compression unit, or 2) there is a default compression strategy for the column for the selected portion, however, the default may be overridden for some compression units, such as a minority of them. The compressions strategy will be assigned type 0 if the data appears sufficiently homogeneous that a single compression strategy would apply to most, or all, of the selected column for the selected portion. The compression strategy will be assigned type 1 if the data appears heterogeneous so that a single compression strategy is unlikely to apply to even a majority of the file. The compression strategy will be assigned type 2 if the data appears somewhat homogeneous but a single compression strategy is likely to apply to a majority of the file. In one embodiment, additional reading of the file beyond the initial sampling may occur if the data in the sampling appear homogeneous to distinguish between type 0 and type 2.

If there are more columns in the file 218, the next such column is selected 220, and the method continues at step 214 using the newly selected column. Otherwise 218, the method continues at step 228.

At step 228, the first column in the received file is selected, and a 32 kilobyte buffer is built in random access memory. 32 kilobytes is used herein as a size of various entities, but other sizes can be used with the present invention. A conventional bitmap and/or bloom filter or other conventional statistical measure is also part of the metadata for the column within the selected portion, built as described below.

A series of 32K pointer buffers, each containing pointers to the 32K buffers when stored on flash as described below is maintained in RAM for storage onto flash memory. Each time processing for a new column for the selected portion of the file is started, a pointer to the same pointer buffer that will contain the first pointer to the 32K buffer for that column for the selected portion is stored in RAM associated with the column and portion identifier 230.

Metadata for the column within the selected portion that is not already initialized is initialized 230 into the buffer. In one embodiment, the metadata for the column within the selected portion includes any or all of the column name, the compression strategy for the column identified as described above, the compression strategy type indicating the applicability of the compression strategy for the column for the selected portion to the compression units in that column for that portion and the minimum and maximum values for the column, which are initialized to their maximum and minimum possible values, respectively.

The shorter of: a) the first 256 rows of the column beginning at the start of the portion or b) the entire column from the start of the selected portion to the end of the selected portion or c) the entire column to the end of the file, are selected 232. Although 256 rows are used in one embodiment, a smaller or larger number of rows, or an indeterminate number of rows, for example, the largest number of whole rows that can fit into an available amount of memory, may be used. The selected part of the selected column is referred herein as a "compression unit". The range of values in the selected compression unit is identified, and the number of bits required or otherwise to be used to compress the data of that range is identified and optionally a compression strategy for the compression unit is identified, along with a dictionary for the compression unit, if applicable 234. A compression strategy for the compression unit would be identified if the type of compression strategy for the currently selected column is other than the compression strategy applies to the entire column for the selected portion of the file. A compression strategy for the compression unit would not be identified if the type of column compression strategy for the selected column and portion of the file indicates that the compression strategy is the default, and the compression strategy for the selected compression unit is the same strategy as for the selected column and selected portion.

Metadata for the selected rows of the compression unit is identified and the selected rows of the column are compressed using the compression strategy, using conventional techniques 236. In one embodiment, this metadata includes the range of the data in the selected rows of the column (e.g. minimum and maximum), and any compression strategy and dictionary identified.

In one embodiment, the minimum of the range may be compressed to zero in some or all compression strategies, and thus the compression involves subtracting the minimum of the selected rows from each value. It is noted that this compression technique means that two of the same values in the same column that are each part of different compression units can be compressed into two different values in their respective buffers, as different minimums may be subtracted from each such value before compression. This can also or instead mean that two of the same values in different compression units of the same column could have different numbers of bits to represent the two same values in different compression units. Compression units within the same column and portion of the file may not have a different compression strategy, though the compression strategy may vary by compression unit within the same portion of the file, and the different compression strategies are stored in the buffer as part of the metadata for each compression unit. Different columns may use the same or different compression strategies. It is also noted that different portions of the file may employ different compression strategies for the same column, for example using all null values in one portion, and values having a minimum and maximum value that is nonzero for at least one other portion, each for the same column in the file.

The size of the metadata and the compressed data is checked against the remaining space in the most-recently created 32 KB buffer as part of step 236. The remaining space excludes available space in the buffer that is reserved for buffer metadata, in one embodiment. If the compressed data and metadata for the compression unit fits in the remaining space in the existing buffer 238, the metadata for the compression unit and the compressed data are added to the buffer in RAM 242 and the method continues at step 244. Otherwise 238, the buffer is written to flash memory, a pointer to the buffer in flash memory is appended to the pointer buffer in random access memory (RAM) (or, if the pointer would not fit in the pointer buffer, a new pointer buffer is appended to the prior pointer buffer in RAM and the pointer, and subsequent pointers for the portion are added to the new pointer buffer, until the new pointer buffer is full, and the process repeats), a new 32 KB buffer is built in RAM 240, and the method continues at step 242. As part of step 240, if a new pointer buffer is added, a pointer to the start of that pointer buffer is stored in RAM.

At step 244 the metadata for the compression unit of the column are incorporated into the metadata for the column within the selected portion, and metadata for the buffer, which is initially considered to have a minimum of the maximum possible representation and a maximum of the minimum possible representation. To incorporate metadata for the compression unit of the column into the metadata for the column within the selected portion, if the minimum for the compression unit is less than the current metadata minimum for the column within the selected portion, the minimum for the compression unit is substituted for the minimum for the selected column within the selected portion. If the maximum for the compression unit is greater than the current metadata maximum for the column within the selected portion, the maximum for the compression unit is substituted for the maximum for the selected column within the selected portion. To incorporate metadata for the compression unit of the column into the metadata for the buffer, if the minimum for the compression unit is less than the current metadata minimum for the buffer, the minimum for the compression unit is substituted for the minimum for the buffer. If the maximum for the selected compression unit is greater than the current metadata for the buffer, the maximum for the compression unit is substituted for the maximum for the buffer.

If there are more rows in the selected column 246, the next 256 rows of the selected column (up to the end of the selected column) are selected 248 and the method continues at step 234 using the newly selected rows for the selected column. Otherwise 246, the method continues at step 250 of FIG. 2B.

At step 250 of FIG. 2B, the last buffer is written to flash and a pointer to it is written to the pointer buffer in RAM as described above (adding a pointer buffer if needed). Additionally, the uncompressed data is used to complete the metadata for the selected column, each of the buffers containing data for the selected column, and for each compression unit for the selected column. The completed metadata is written with the other corresponding metadata. The metadata added may include any or all of a conventional bitmap, a conventional bloom filter, and a count of null rows or fraction of null rows to the total number of rows. The metadata for the column corresponds to the data in the column, the metadata for the buffer corresponds only to all of the data in that buffer and the metadata for the compression unit corresponds only to the data in that compression unit.

It is noted that one or more parts or all of step 250 may be performed at other steps of the method, and may not be required to be performed after each column has been processed as described herein. For example, metadata for the compression unit can be completed at step 236, and/or some of the metadata for the selected column and the buffer may be identified at each pass of step 236. Some or all of this additional metadata for the compression unit may be written into the buffer with the other metadata for the compression unit in step 236 or at another time and the metadata for the buffer may be written to the buffer with the other compression unit information in step 240 or at another time. In the embodiment in which this additional metadata for the compression unit of the selected column is not identified before the size is checked, space for such metadata may be reserved for such metadata and included in the calculation as to whether sufficient space exists, and otherwise it may be identified and used to check the size of the metadata with the compressed data.

If a column dictionary was identified 252, either applying to the whole column or applying to the whole column with exceptions, the column dictionary is stored in a series of one or more 32 kilobyte buffers in flash memory and a pointer to the column dictionary is stored in the pointer buffer 254 and otherwise 252, the method continues at step 256. A pointer to each buffer of the column dictionary is retained associated with the column to which it corresponds, for use as described below as part of step 254. As described herein, the pointer to the column dictionary is inserted into the pointer buffer at the end of the pointers to the buffers for that column. However, in another embodiment, steps 252 and 254 may be inserted between steps 230 and 232 to add the pointer to the column dictionary ahead of the pointers to the compression units for that column in the pointer buffer, with step 232 following the no branch of step 252.

If there are more columns in the file 256, the next column is selected, a new 32 kilobyte buffer is built 258, and the method continues at step 230, using the newly selected column and buffer. In another embodiment, a new buffer is not automatically selected at the end of each column, though a new buffer is used if the data and metadata doesn't fit in the remaining space of the existing buffer as described above. If there are no more columns in the file 256, the method continues at step 260.

At step 260, the one or more pointer buffers in RAM are written to flash memory, a header is built in one or more 32 kilobyte buffers in flash memory that follows the pointer buffers. The header includes pointers to each of the pointer buffers in flash memory. Following the header, in one or more additional 32 kilobyte buffers in flash memory, or as part of the end of the header are written column pointers, one for each column in the file, containing the column name, and a pointer to a location of column metadata for that column in flash memory, described below 262. A pointer to the header is stored in RAM.

The column metadata for each of the columns is written 264 to flash memory in one or more 32 kilobyte buffers following the last buffer containing the column pointers. Adjacent to the column metadata for a column is written a pointer to the buffer pointer in the pointer buffer corresponding to the first compression unit in the column for the selected portion of the file, and optionally a pointer to the first pointer in the pointer buffer to a column dictionary for the selected column, if one was used, as part of step 264.

Referring now to FIG. 2C, if there are more portions in the file 266, the next portion is selected, the portion is read into RAM, the metadata for all columns for the portion is initialized, as described above 268, and the method continues at step 212 of FIG. 2A, using the newly selected portion. Otherwise 266, the pointers to the header for each portion are provided and used to access data in the file in flash memory. In one embodiment, the pointers to the header of each of the portions of the file may be written to flash memory as part of step 270. The header (and column pointers if they are not part of the header) may be read and used in conjunction with the column metadata, buffer metadata and compression unit metadata to determine the need to read a certain column or compression unit in the flash, and to locate such data to be read from the file.

To decompress the compression units while reading the file, the compression unit compression strategy and dictionary takes precedence over any compression strategy for the column within the portion of the file.

System.

Figure 3:
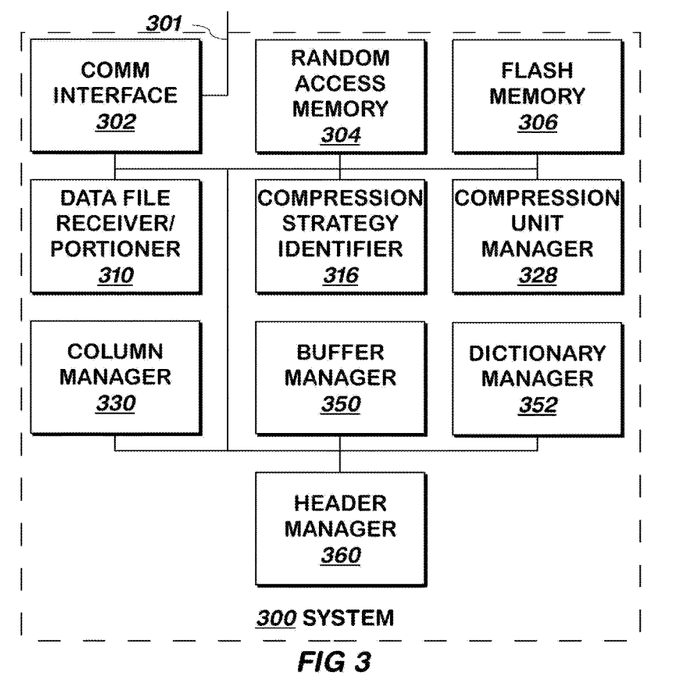
FIG. 3 is a block schematic diagram of a system, including Random Access Memory, for storing a database on flash memory or other similarly write-constrained storage according to one embodiment of the present invention.
Figure 4A:
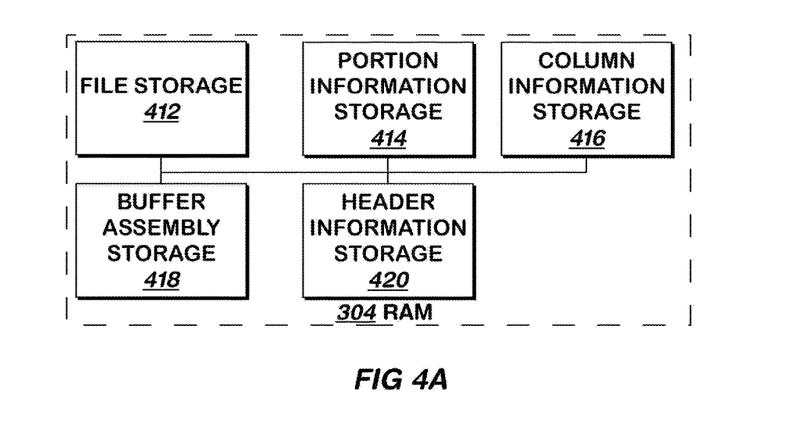
FIG. 4A is a block schematic diagram of the random access memory of FIG. 3 according to one embodiment of the present invention.
Figure 4B:
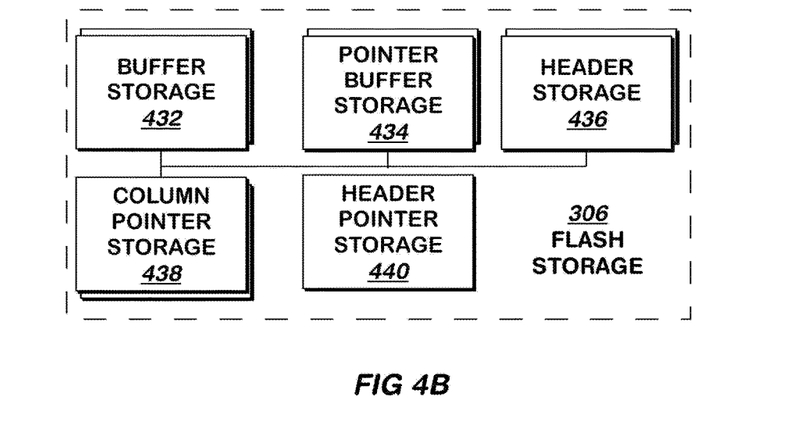
FIG. 4B is a block schematic diagram of the flash memory of FIG. 3 according to one embodiment of the present invention.

FIG. 3 illustrates a system 300 for storing database in flash memory according to one embodiment of the present invention. The system 300 of FIG. 3 may include a conventional computer system that includes random access memory 304, which includes conventional random access memory, and flash memory 306, which includes flash storage as described above. FIG. 4A illustrates random access memory 304 of FIG. 3 in more detail according to one embodiment of the present invention, and FIG. 4B illustrates the flash storage 306 of FIG. 3 in more detail according to one embodiment of the present invention. Except for the storage elements 304, 306, other elements of FIG. 3 may incorporate a conventional hardware computer processor system coupled to a hardware memory system or other conventional circuitry, programmed or wired to operate as described herein.

Referring to FIGS. 3, 4A and 4B, communication interface 302 includes a conventional TCP/IP communication interface running suitable communication protocols, such as conventional disc drive protocols, TCP/IP and Ethernet and is coupled via input/output 301 to one or more disk drives and a conventional network such as an Ethernet network and the networks that make up the conventional Internet. In one embodiment, all communication into or out of system 300 is made via input/output 301 of communication interface 302.

Data file receiver/portioner 310 receives or reads a database file into file storage 412 of RAM 304, either a portion at a time, or in its entirety, and identifies and selects the first portion of the file as described above, and stores boundary information for the first portion in portion information storage 414 of RAM 304. Data file receiver/portioner 310 initializes the column metadata for each column in the portion of the file in column information storage 416, and includes the name of the column, or assigns an identifier to the column, for each such column in the file it reads. Data file receiver/portioner 310 signals compression strategy identifier 316 with a handle to the file in file storage 412 and an indication of the portion (i.e. starting and ending rows in the portion).

When it receives the handle and indication of the portion, compression strategy identifier 316 performs the sampling of the portion of the file described above to identify a compression strategy, a compression strategy type, and optionally, identifies a data dictionary, for each column, and stores them associated with the column name or column identifier in column information storage 408 of RAM 304. Compression strategy identifier 316 then signals column manager 330 with the handle to the file and the indication of the portion.

When signaled, column manager 330 selects the first column, builds a buffer in buffer assembly storage 418 of RAM 304, marks the buffer as the first buffer for the column, initializes to zero the amount of data stored in the buffer, stores a pointer to the buffer in a pointer buffer in buffer assembly storage 418 as the current buffer pointer, initializes the minimum and maximum metadata for the selected column as described above and provides the handle of the file, the indication of the portion, an indication that the first row in the portion is to be the next row selected, and the column identifier to compression unit manager 328.

When it receives such information, compression unit manager 328 selects the compression unit: the shorter of 256 rows or to the end of the portion of the file or the end of the file (if portions aren't used) in file storage 412, scans the column corresponding to the column identifier it received within the compression unit it selected, identifies the range of values in the column within the compression unit, identifies the compression strategy for the compression unit if the compression type stored in column information storage 416 for the column allows it or indicates the column compression strategy is to be used if one exists, and identifies the number of bits that will accommodate the range of values, stores such metadata into a temporary workspace in buffer assembly storage 418 corresponding to the current buffer pointer in buffer assembly storage 418, generates an indication of the selected rows (e.g. row number of first and last row) and signals buffer manager 350 with the handle to the file, indication of the portion, identifier of the column, a pointer to the metadata, and the indication of the rows selected.

When signaled, buffer manager 350 compresses the compression unit containing the rows in the file corresponding to the handle it received of the column defined by the identifier of the column and the indication of the rows selected, and checks the size of the compressed data from the compression unit and the size of the metadata in the temporary workspace to determine if it will fit (after allowing space for the buffer metadata) into the buffer corresponding to the current buffer pointer in buffer assembly storage 418. If so, it stores the compressed compression unit data and the metadata for the compression into the buffer in buffer assembly storage 418 pointed to by the current buffer pointer, updates the amount of data in the buffer stored in buffer assembly storage 418, incorporates the metadata for the compression unit into the metadata for the column in column information storage 416 and the metadata for the buffer stored in buffer assembly storage 418 in RAM 304 as described above, and signals compression unit manager 328 with the handle to the file, identifier of the column, the indication of the portion, and an indication that the row after the last row in the indication of the rows selected is to be selected.

If the compressed data and compression unit metadata will not fit into the buffer, buffer manager 350 writes into buffer storage 432 in flash storage 306 the buffer in buffer assembly storage 418 corresponding to the current buffer pointer in buffer assembly storage 418, and adds a pointer to the buffer in flash to the pointer buffer in buffer assembly storage 418, creating a new pointer buffer following the prior pointer buffer if the pointer buffer is full, writes into buffer storage 432 in flash storage 306 the buffer in buffer assembly storage 418 corresponding to the pointer it receives, builds a new buffer in buffer assembly storage 418 and stores the compressed compression unit data and the metadata for the compression into the new buffer in buffer assembly storage 418, stores in buffer assembly storage 418 a pointer to the new buffer as the current buffer pointer in place of the existing current buffer pointer, initializes to the amount of data it stored in the buffer as the amount of data stored in the buffer, incorporates the metadata for the compression unit into the metadata for the column in column information storage 416 and the metadata for the new buffer stored in buffer assembly storage 418 as described above, and signals compression unit manager 328 with the handle to the file, the identifier of the column, the indication of the portion, and an indication that the row after the last row in the indication of the rows selected it received is to be selected.

In one embodiment, buffer manager 350 writes the indication of the rows selected as the compression unit with the other metadata for the compression unit, and such information is incorporated into the buffer and column metadata with the other information incorporated.

Compression unit manager 328 checks to see that there are more rows in the section of the file as indicated in portion information storage 414 and if so, repeats the process described above starting with the row after the last row it selected. If there are no more rows in the section of the file, compression unit manager 328 signals buffer manager 350 with the handle to the file, and the identifier of the column and an indication that the portion of the column has been fully processed.

When so signaled, buffer manager 350 writes into buffer storage 432 in flash storage 306 the buffer in buffer assembly storage 418 corresponding to the current buffer pointer in buffer assembly storage 418, and adds a pointer to the buffer in flash to the pointer buffer in buffer assembly storage 418, creating a new pointer buffer following the prior pointer buffer if the pointer buffer is full. (It is noted that the current buffer pointer may be passed as a parameter rather than remaining in buffer assembly storage 418).

As it writes a buffer, buffer manager 350 checks to see if the buffer is marked as the first buffer for the column, and if so, it also stores into column information storage 416 a pointer to the pointer (in pointer buffer storage 434) to the buffer into column information storage, associated with the column identifier it received.

Buffer manager 350 then completes the metadata for the buffers for the column, the buffer, and any compression unit for the column in buffer storage 432 for the metadata for the buffer or compression unit) or column storage 416 for the metadata for the column, such as by writing bitmaps, bloom filters, counts or fractions of nulls in the respective component, storing such additional metadata with the other metadata for such component. In one embodiment, such additional metadata for the compression unit is written to the buffer in buffer assembly storage 418 by compression unit manager 328, and/or is written to the buffer metadata for an old buffer in buffer storage 432 by buffer manager 350 each time the old buffer is stored when a new buffer is created, and when it writes the last buffer for a column for the current portion. Buffer manager 350 then signals dictionary manager 352 with the identifier of the column.

When so signaled, dictionary manager 352 identifies in column information storage 416 whether there is a dictionary for the column corresponding to the identifier it receives, and if so, stores the dictionary into one or more dictionary buffers in buffer storage 432 in flash storage 306, stores the pointer or pointers to the dictionary buffer or buffers into the pointer buffer in buffer assembly storage 418 in RAM 304 marked with the column identifier of the column to which the dictionary buffer or buffers correspond, and signals column manager 330. Dictionary manager 352 stores into column information storage 416, associated with the identifier of the column it received, a pointer to the pointer or pointers to the dictionary buffer in buffer assembly storage 418. In one embodiment, the dictionary pointer or pointers can be inserted at a different location in buffer assembly storage 418, such as before the other pointers for the column.

When so signaled, column manager 330 identifies whether there are more columns using the column identifiers in column information storage 416 and if so, selects the next column for the portion and repeats the process described above, internally storing the column identifier of the selected column each time. If there are no more columns, column manager 330 signals header manager 360.

When signaled, header manager 360 stores the one or more pointer buffers in buffer assembly storage 418 in RAM 304 into a set of one or more pointer buffers in pointer buffer storage 434 in flash memory 306, and stores into header information storage 420 pointers to each of these buffers. Header manager 360 then stores these pointers into header storage 436 following the pointers in the pointer buffers.

Header manager 360 then stores into column pointer storage 438 which follows header storage 436 in flash memory 306 the column pointers containing, for each column in the file, the column metadata, the pointer to the pointer in pointer buffer storage 434 pointing to the buffer containing the first compression unit for the column, and the pointer to the first pointer or all pointers in pointer buffer storage 434 pointing to any column dictionary, if one applies to the column, all such information being taken from column information storage 416.

Header manager 360 stores into header pointer storage 440 a pointer to the beginning of header storage 436 for the portion of the file, and optionally, a portion identifier of the file. Header manager 360 may also store the last row number of the file for each portion with the pointer to the portion. Header manager 360 then signals data file receiver/portioner 310, which selects the next portion of the file, if any, and repeats the process described above for the next portion. When there are no more portions, the pointers to the portions for the entire file will have been stored in header pointer storage 440. There is one buffer storage 432, one pointer buffer storage 434, one header storage 436 and one column pointer storage 438 for each portion of the file, in one embodiment. The one corresponding to the currently processed portion is used for storage of information for that portion in such embodiment.

Certain Embodiments of the Present Invention

Described herein is a method of writing a database to a computer memory that degrades when written, including: selecting a first group of a specified number of rows of a column of the database; compressing the selected rows of the column to produce a compressed version of the rows of the column; storing into the computer memory, the compressed version of the rows of the column into as many one or more buffers of a given size as are required to hold all of the compressed version of the rows of the column, each of the one or more buffers not used to hold rows of any column outside of the group; repeating the selecting, compressing and storing steps for each of multiple other groups of the column; storing into one or more pointer buffers, each of a certain size, pointers to each of the buffers in the computer memory holding the compressed versions of the first group and each of the multiple other groups, with an indicator of the pointer to the first buffer of the first group; storing in the computer memory metadata that applies to all of: the first group and the multiple other groups; and storing in the computer memory, with the metadata, a pointer to the pointer in one of the one or more pointer buffers pointing to the first group.

The method may include optional features, whereby: additionally including dividing the column into multiple portions; and wherein the first group and the multiple other groups are all part of a single one of the multiple portions of the column.

The method may include optional features, whereby the metadata includes a compression strategy that is used to compress some, but not all of: the first group and the multiple other groups.

The method may include optional features, whereby the storing comprises storing an additional compression strategy used to compress rows in one of: A) the first group and B) one of the other groups, the additional compression strategy different from the compression strategy.

The method may include optional features, whereby the compressing the some but not all of: the first group and the multiple other groups, is responsive to a dictionary.

The method may additionally include: storing in the computer memory the dictionary; storing a pointer to the dictionary in the one or more pointer buffers; and storing in the computer memory, with the metadata, a pointer to said pointer to the dictionary.

Described herein is a system for writing a database to a computer memory that degrades when written, including: a compression unit manager having an input for receiving more than a specified number of rows of a column of a database and for selecting and providing at an output a first group of the specified number of rows of the column of the database; and a buffer manager having an input coupled to the compression unit manager output for receiving the first group of the specified number of rows of the column of the database, the buffer manager for compressing the selected rows of the column to produce a compressed version of the rows of the column, and for storing via an output into the computer memory, the compressed version of the rows of the column into as many one or more buffers of a given size as are required to hold all of the compressed version of the rows of the column, each of the one or more buffers not used to hold rows of any column outside of the group; and whereby: the compression unit manager and buffer manager for repeating the selecting, compressing and storing steps for each of multiple other groups of the column; and the buffer manager is additionally for storing via the buffer manager output into one or more pointer buffers, each of a certain size, pointers to each of the buffers in the computer memory holding the compressed versions of the first group and each of the multiple other groups, with an indicator of the pointer to the first buffer of the first group, and for storing in the computer memory metadata that applies to all of: the first group and the multiple other groups, and for storing via the buffer manager output in the computer memory, with the metadata, a pointer to the pointer in one of the one or more pointer buffers pointing to the first group.

The system: may additionally include a data file receiver/portioner having an input for receiving at least the column of the database, the data file receiver/portioner for dividing the column into multiple portions and for providing at an output the multiple portions; and may include optional features, whereby: the compression unit manager input is coupled to the data file receiver/portioner output for receiving the multiple portions, each of the portions including more than the specified number of rows of the column of the database; and the first group and the multiple other groups are all part of a single one of the multiple portions.

The system: may additionally include a compression strategy identifier having an input coupled to the data file receiver/portioner output for receiving the multiple portions, for identifying and providing at an output a compression strategy for the single one of the multiple portions, and may include optional features, whereby: the buffer manager input is additionally coupled to the compression strategy identifier output for receiving the compression strategy for the single one of the multiple portions; and the metadata stored by the buffer manager includes the compression strategy that the buffer manager used to compress some, but not all, of: the first group and the multiple other groups.

The system may include optional features, whereby: the compression unit manager is additionally for identifying and providing at the compression unit manager output an additional compression strategy used to compress rows in one of A) the first group and B) one of the other groups, the additional compression strategy different from the compression strategy; the buffer manager input is additionally for receiving the additional compression strategy; the buffer manager compresses the rows of the one of the first group and the one of the other groups responsive to the additional compression strategy; and the buffer manager stores the additional compression strategy with the one of: the first group and one of the other groups.

The system may include optional features, whereby: the compression strategy provided by the compression strategy identifier comprises a dictionary; and the buffer manager performs the compressing the some but not all of: the first group and the multiple other groups, responsive to the dictionary.

The system may include optional features, whereby the buffer manager is additionally for: storing via the buffer manager output in the computer memory the dictionary; storing via the buffer manager output a pointer to the dictionary in the one or more pointer buffers; and storing via the buffer manager output in the computer memory, with the metadata, a pointer to said pointer to the dictionary.

Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

Described herein is a computer program product including a nontransitory computer useable medium having computer readable program code embodied therein for writing a database to a computer memory that degrades when written, the computer program product including computer readable program code devices configured to cause a computer system to: select a first group of a specified number of rows of a column of the database; compress the selected rows of the column to produce a compressed version of the rows of the column; store into the computer memory, the compressed version of the rows of the column into as many one or more buffers of a given size as are required to hold all of the compressed version of the rows of the column, each of the one or more buffers not used to hold rows of any column outside of the group; repeat the selecting, compressing and storing steps for each of multiple other groups of the column; store into one or more pointer buffers, each of a certain size, pointers to each of the buffers in the computer memory holding the compressed versions of the first group and each of the multiple other groups, with an indicator of the pointer to the first buffer of the first group; store in the computer memory metadata that applies to all of: the first group and the multiple other groups; and store in the computer memory, with the metadata, a pointer to the pointer in one of the one or more pointer buffers pointing to the first group.

The computer program product: may additionally include computer readable program code devices configured to cause the computer system to divide the column into multiple portions; and may include optional features, whereby the first group and the multiple other groups are all part of a single one of the multiple portions of the column.

The computer program product may include optional features, whereby the metadata includes a compression strategy that is used to compress some, but not all of: the first group and the multiple other groups.

The computer program product may include optional features, whereby the computer readable program code devices configured to cause the computer system to store comprises computer readable program code devices configured to cause the computer system to store an additional compression strategy used to compress rows in one of: A) the first group and B) one of the other groups, the additional compression strategy different from the compression strategy.

The computer program product may include optional features, whereby the computer readable program code devices configured to cause the computer system to compress the some but not all of: the first group and the multiple other groups, is responsive to a dictionary.

The computer program product may additionally include computer readable program code devices configured to cause the computer system to: store in the computer memory the dictionary; store a pointer to the dictionary in the one or more pointer buffers; and store in the computer memory, with the metadata, a pointer to said pointer to the dictionary.

What is claimed is:

1. A system for writing a database to a computer memory that degrades when written, comprising:
    a data file receiver/portioner having an input for receiving at least a column of the database, the data file receiver/portioner for dividing the column into a plurality of portions and for providing at an output the plurality of portions, each of the portions in the plurality comprising more than a specified number of rows of the column of the database;
    a compression unit manager having an input coupled to the data file receiver/portioner output for receiving the plurality of portions, and for selecting and providing at an output a first group of the specified number of rows of the column of the database; and
    a buffer manager having an input coupled to the compression unit manager output for receiving the first group of the specified number of rows of the column of the database, the buffer manager for compressing the selected rows of the column to produce a compressed version of the rows of the column, and for storing via an output into the computer memory, the compressed version of the rows of the column into as many one or more buffers of a given size as are required to hold all of the compressed version of the rows of the column, each of the one or more buffers not used to hold rows of any column outside of the first group;
    and
    wherein:
        the compression unit manager and the buffer manager are additionally for repeating the selecting, compressing and storing for each of a plurality of other groups of the column;
        the buffer manager is additionally for storing via the buffer manager output into one or more pointer buffers, each of a certain size, pointers to each of the one or more buffers in the computer memory holding the compressed versions of the first group and each of the plurality of other groups, with an indicator of a one of the pointers to a first buffer of the first group, and for storing in the computer memory, metadata that applies to all of: the first group and the plurality of other groups, and for storing via the buffer manager output in the computer memory, with the metadata, a pointer to the one of the pointers in one of the one or more pointer buffers pointing to the first buffer of the first group and
        the first group and the plurality of other groups are all part of a single one of the plurality of portions.

2. The system of claim 1:
    additionally comprising a compression strategy identifier having an input coupled to the data file receiver/portioner output for receiving the plurality of portions, for identifying and providing at an output a compression strategy for the single one of the plurality of portions, and
    wherein:
    the buffer manager input is additionally coupled to the compression strategy identifier output for receiving the compression strategy for the single one of the plurality of portions; and
    the metadata stored by the buffer manager includes the compression strategy that the buffer manager used to compress some, but not all, of: the first group and the plurality of other groups.

3. The system of claim 2, wherein:
    the compression unit manager is additionally for identifying and providing at the compression unit manager output an additional compression strategy used to compress rows in one of A) the first group and B) one of the plurality of other groups, the additional compression strategy different from the compression strategy;
    the buffer manager input is additionally for receiving the additional compression strategy;

the buffer manager compresses the rows of the one of the first group and the one of the plurality of other groups responsive to the additional compression strategy; and the buffer manager stores the additional compression strategy with the one of: the first group and the one of the plurality of other groups.

4. The system of claim 2, wherein:

the compression strategy provided by the compression strategy identifier comprises a dictionary; and the buffer manager performs the compressing the some but not all of: the first group and the plurality of other groups, responsive to the dictionary.

5. The system of claim 4, wherein the buffer manager is additionally for:

storing via the buffer manager output in the computer memory the dictionary;

storing via the buffer manager output a pointer to the dictionary in the one or more pointer buffers; and storing via the buffer manager output in the computer memory, with the metadata, a pointer to said pointer to the dictionary.

\* \* \* \* \*